US006961426B2

(12) United States Patent
Vesely

(10) Patent No.: US 6,961,426 B2
(45) Date of Patent: Nov. 1, 2005

(54) CASCADED STREAM CIPHER

(76) Inventor: Ivan Vesely, 1884 Tradan Dr., San Jose, CA (US) 95132

( * ) Notice: Subject to any disclaimer, the term of this patent is extended or adjusted under 35 U.S.C. 154(b) by 773 days.

(21) Appl. No.: 09/947,032

(22) Filed: Sep. 4, 2001

(65) Prior Publication Data

US 2002/0054679 A1 May 9, 2002

Related U.S. Application Data

(60) Provisional application No. 60/230,831, filed on Sep. 7, 2000.

(51) Int. Cl.[7] ............................................. H04L 9/00
(52) U.S. Cl. ...................... 380/42; 380/44; 380/268; 380/47; 380/46
(58) Field of Search ........................ 380/44, 268, 47, 380/46, 42, 274, 265, 45; 713/168, 174, 180; 708/252

(56) References Cited

U.S. PATENT DOCUMENTS

| | | | | |
|---|---|---|---|---|
| 3,691,472 A | * | 9/1972 | Bohman | 327/164 |
| 4,181,816 A | | 1/1980 | Vasseur | 178/22 |
| 5,117,380 A | * | 5/1992 | Tanagawa | 708/251 |
| 5,253,294 A | | 10/1993 | Maurer | 380/21 |
| 5,365,588 A | | 11/1994 | Bianco et al. | 380/42 |
| 5,414,771 A | | 5/1995 | Fawcett, Jr. | 380/44 |
| 5,440,640 A | | 8/1995 | Anshel et al. | 380/46 |
| 5,675,653 A | | 10/1997 | Nelson, Jr. | 380/28 |
| 5,703,952 A | | 12/1997 | Taylor | 380/44 |
| 5,784,462 A | | 7/1998 | Tomida et al. | 380/21 |
| 5,983,252 A | | 11/1999 | Clapp | 708/250 |
| 6,038,321 A | | 3/2000 | Torigai et al. | 380/268 |
| 6,044,388 A | | 3/2000 | DeBellis et al. | 708/254 |
| 6,049,608 A | | 4/2000 | Ablowitz et al. | 380/28 |
| 6,078,663 A | * | 6/2000 | Yamamoto | 380/260 |
| 6,091,819 A | | 7/2000 | Venkatesan et al. | 380/28 |
| 6,307,940 B1 | * | 10/2001 | Yamamoto et al. | 380/277 |
| 6,581,078 B1 | * | 6/2003 | Liardet | 708/250 |
| 6,609,206 B1 | * | 8/2003 | Veneklase | 713/202 |
| 6,775,776 B1 | * | 8/2004 | Vogt et al. | 713/186 |
| 6,792,439 B2 | * | 9/2004 | Schmidt | 708/250 |

OTHER PUBLICATIONS

Title: Scalable Parallel Pseudo–Random Number Generator Library, Date: May 25, 1998, pp 1–4.*
J. Kelsey & Peter K. Suk, "A Cryptographic Pseudorandom Number Generator", Newsgroup Message, SCI, Crypto. Research, Mar. 8, 1995, 1 page.
A. Menezes et al., *Handbook of Applied Cryptography*, CRC Press (1997), Chapter 5, "Pseudorandom Bits and Sequences", pp. 169–190.
M. J. B. Robshaw, "Stream Ciphers", RSA Tech. Report, TR–701, Version 2, Jul. 25, 1995, pp. 1–42.

(Continued)

*Primary Examiner*—Gilberto Barrón, Jr.
*Assistant Examiner*—Venkat Perungavoor
(74) *Attorney, Agent, or Firm*—Schneck & Schneck; Thomas Schneck; Mark Protsik

(57) ABSTRACT

A pseudo-random number generating circuit and method, comprising: a plurality of pseudo-random number generator (PRNG) units combined in a cascade structure of several layers to produce a pseudo-random output stream, the PRNG units of any given layer running more slowly than those PRNG units of more downstream layers of the cascade structure and running more quickly than those PRNG units of more upstream layers of the cascade structure, the PRNG units including a relatively slow but cryptographically very secure PRNG unit feeding the most upstream layer of the cascade structure, and very fast, but possibly cryptographically insecure PRNG unit at the most downstream layer.

37 Claims, 2 Drawing Sheets

OTHER PUBLICATIONS

D. E. Knuth, "The Art of Computer Programming", vol. 2, Seminumerical Algorithms, $3^{rd}$ Ed., Addison Wesley, 1998, pp. 10–25, pp. 27–29, and pp. 186–188.

U. Blocher et al., "Fish: A Fast Software Stream Cipher", *Fast Software Encryption*, Springer, LNCS, vol. 809, pp. 41–44.

R. Anderson, "On Fibonacci Keystream Generators", *Fast Software Encryption*, $2^{nd}$ Int'l Workshop Proc., pp. 346–352.

L. Blum et al., "A Simple Unpredictable Pseudo–Random Number Generator", *SIAM J. on Computing*, vol. 15, No. 2, 1986, pp. 364–383.

P. Rogaway et al., "A Software–Optimized Encryption Algorithm", *J. of Cryptology*, vol. 11, No. 4, 1998, pp. 273–287.

T. Ritter, "The Efficient Generation of Cryptographic Confusion Sequences", *Cryptologia*, vol. 15, No. 2, pp. 81–139.

N. I. S. T., Fips Pub 180–1, "Secure Hash Standard", Apr. 17, 1995, pp. 1–21.

* cited by examiner

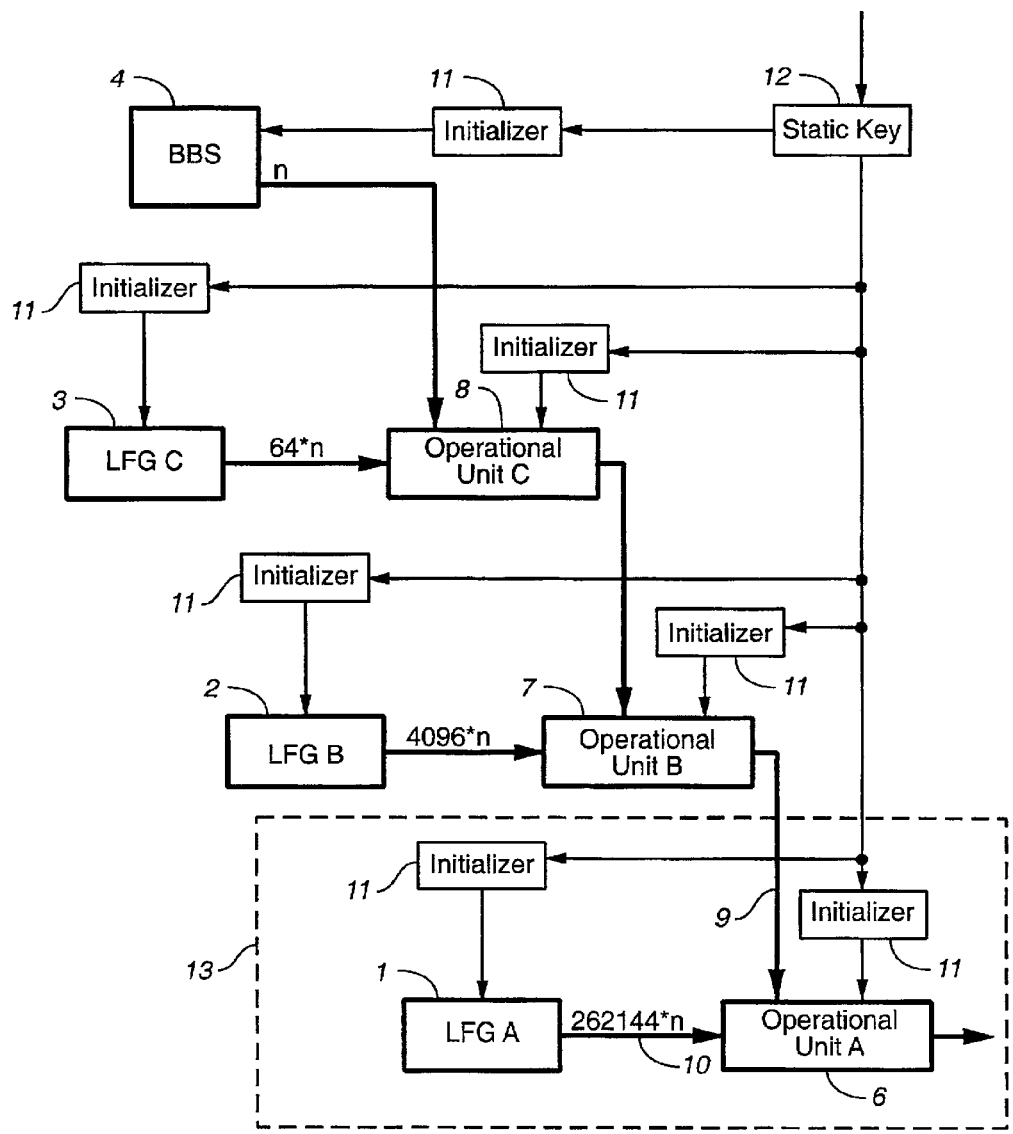
FIG._1

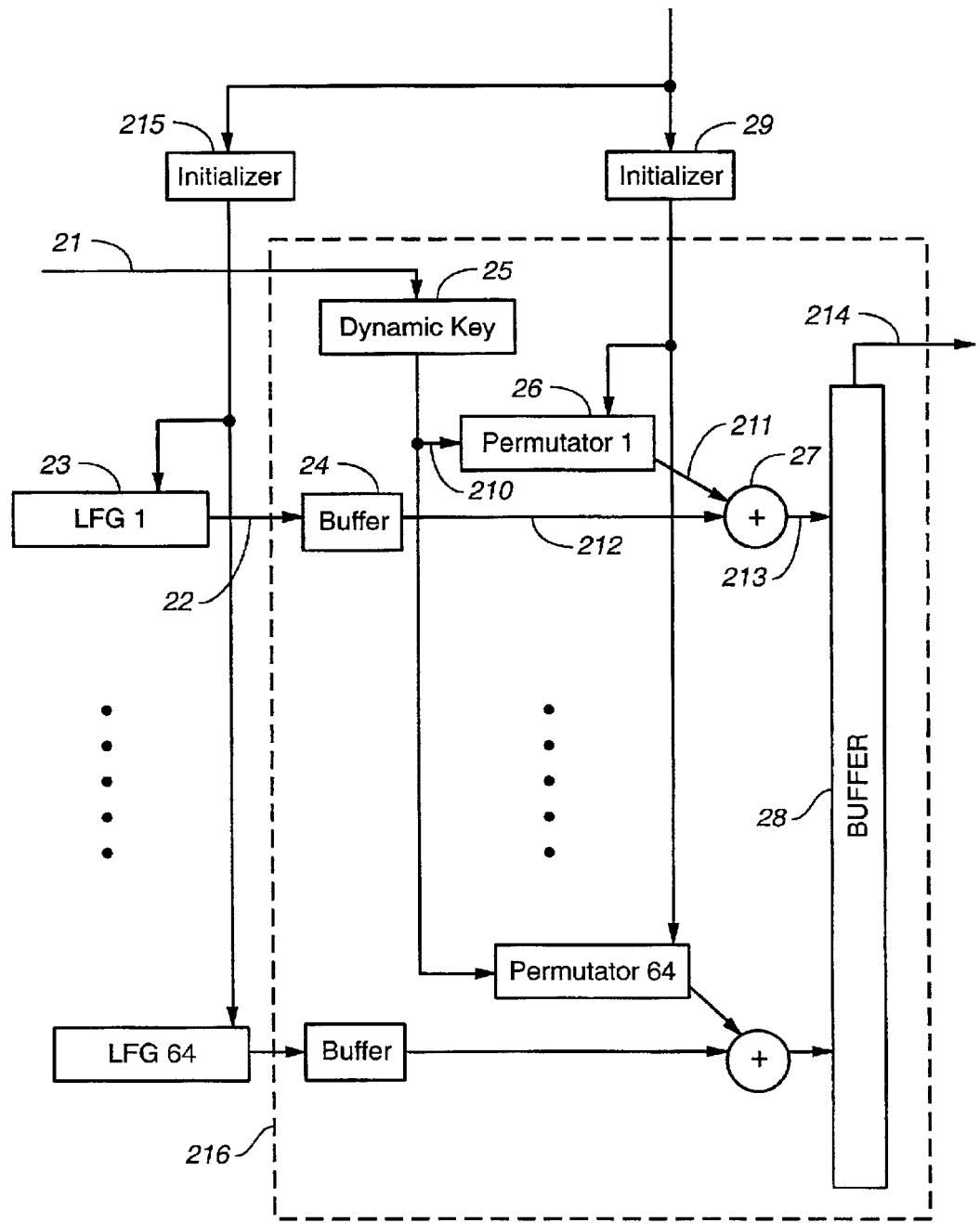
FIG._2

CASCADED STREAM CIPHER

CROSS-REFERENCE TO RELATED APPLICATION

This application claims priority under 35 U.S.C. § 119(e) from prior U.S. provisional application No. 60/230,831, filed Sep. 7, 2000.

TECHNICAL FIELD

This invention relates generally to data storage and data transmission security. More particularly, the present invention relates to methods of encrypting and decrypting stored and/or transmitted data.

BACKGROUND ART

Methods of making written text unreadable by those to whom it is not intended are at least 2000 years old. This is accomplished by ciphers. Their objective is to transform the message such that it can be read only with the help of a key. The original message is known as plaintext, the transformed message is known as ciphertext. A new era of cryptography began with the computer age. Software and/or digital hardware can be employed to perform encrypting and decrypting operations very rapidly.

One way to classify encryption methods (ciphers) is into private (symmetric) and public (asymmetric). In case of a private cipher the message is decrypted with the same key it was encrypted. In case of public ciphers the encryption key cannot decrypt the message. Therefore it needs not be kept secret and can be made public. Another key, the private key must be used to decrypt the message. Another classification is into block ciphers and stream ciphers. A block cipher transforms blocks of fixed size one block at a time into another block, typically of the same size such that:

$$C = f(P, K)$$

where C is the encrypted block, P is the original block, K is the key, and f is the encrypting transformation. Presumably the person who does not know the key K will not be able to recover P from C. An example of such a cipher is DES. (Bruce Schneier: *Applied Cryptography*, John Willey & Sons, 1994, pp. 219–241.) A stream cipher generates a very long stream of pseudo-random numbers. The message is encrypted with this stream. If the message consists of a sequence of 8-bit ASCII codes such that each character takes one byte of computer memory then each byte is transformed by one of the pseudo-random numbers, typically by performing exclusive or operation. An example: if $$\{Pi\} = P1, P2, P3, \ldots Pi, \ldots Pn$$

is the original message i.e. a sequence of characters (bytes)

$$\{Ri\} = R1, R2, R3, \ldots Ri, \ldots Rn$$

is the stream of pseudo-random numbers, then $$\{Ci\} = P1 \text{ xor } R1, P2 \text{ xor } R2, P3 \text{ xor } R3, \ldots Pi \text{ xor } Ri, \ldots Pn \text{ xor } Rn$$

is the encrypted message. ('xor' signifies the exclusive or operation.)

There are several methods for generating pseudo-random numbers. The three most common are linear congruential generators, linear feedback shift register (LFSR) generators, and lagged Fibonacci generators (LFG). None of these methods alone are suitable for encryption purposes because the cryptanalyst can readily decipher them. In order to be usable for encryption these methods have to be modified. Various combinations of shift register generators are most often used to generate stream ciphers.

Encryption methods and devices are applicable in all situations where data are stored or transmitted. With the emergence and growth of Internet there is an ever increasing need to protect information from unauthorized interception. Encryption is an important class of methods for accomplishing computer and network security and for guarding sensitive information.

PRIOR ART

The most common devices used in stream ciphers are linear feedback shift registers (LFSR). Their operation is described e.g. in Bruce Schneier: *Applied Cryptography*, John Willey & Sons, 1994, pp. 351–356. The cipher generated by only one such shift register is easy to break. In order to obtain a cryptographically secure stream cipher based on linear feedback shift registers it is necessary to combine several of them. A number of ways to combine several feedback shift registers have been proposed. One example of an encryption method based on combination of LFSRs is described in U.S. Pat. No. 5,703,952 "Method and Apparatus for Generating a Stream Cipher", 1997. The most relevant examples are "Beth-Piper Stop-and-Go Generator", "Gollman Cascade", "Alternating Stop-and-Go Generator", "Bilateral Stop-and-Go Generator". (Bruce Schneier: *Applied Cryptography*, John Willey & Sons, 1994, pp. 359–361) These combinations share with the current invention the feature that the individual LFSRs are clocked asynchronously.

But there are other ways of generating pseudo-random streams of numbers. Particularly interesting are Lagged Fibonacci Generators (LFG). They operate on a principle similar to LFSRs, but unlike LFSRs, which generate only one bit at a time, they generate an entire word of length n in one operation, n is typically 16, 32, or 64. LFGs have some good properties such as very long period. They can be used as random number generators for mathematical computations. Their disadvantage is that they do not satisfy certain statistical tests. In order to do so they have to be modified. (Donald E. Knuth: *The Art of Computer Programming*, Volume 2, Seminumerical Algorithms, Third Edition, Addison Wesley, 1998, pp. 27–29, 186–188) The advantage of LFGs over LFSRs is that they are faster. Furthermore the trend is towards implementing encryption operations in software and LFGs are much easier to implement that way than LFSRS. Recently attention has been turning to using LFGs as the basis of encryption methods. LFGs also have to be combined; otherwise, the cipher is trivial to break. Methods of doing so have appeared in literature. Examples are in the following articles: U. Blocher, M. Dichtl, "Fish: a fast software stream cipher", *Fast Software Encryption*, Springer, LNCS, v. 809 pp. 41–44 and Ross Anderson, "On Fibonacci Keystream Generators", *Fast Software Encryption*, Second International Workshop, Proceedings, pp. 346–52. "Fish" is no longer viable since it has already been broken (Anderson, "On Fibonacci Keystream Generators"). The method proposed by Anderson, called "PIKE", takes 2.75 LFG ticks per one LFG tick i.e. it is 2.75 times slower than the LFG alone. The method proposed in the present invention takes less than 2 ticks per one LFG tick.

Mathematical analysis discovered random number generators that are slow but very secure cryptographically. The quadratic residue random number generator, also known as Blum Blum Shub (BBS), is believed to be unbreakable. Its main disadvantage is that it is too slow for most practical applications. By the term cryptographically secure we mean difficult to break. In case of the BBS generator it has been proven mathematically that under certain assumptions the computational effort required to break it is so large that it cannot be practically accomplished. (L. Blum, M. Blum, and M. Shub: "A Simple, Unpredictable Pseudo-Random Number Generator", *SIAM Journal on Computing*, v. 15, n. 2, 1986, pp. 364–383).

In 1995 on the Internet John Kelsey suggested "using a fast stream cipher for short lengths of ciphertext, and then refilling the internal state from a slower cipher." The idea was elaborated by Peter Kwangjun Suk, who suggested "using the secure Blum-Blum-Shub quadratic residue generator with a 512 bit modulus? We could run a fast 64-bit block cipher in OFB mode, and occasionally flush the shift register and insert 63 bits from seven iterations of the BBS generator . . . . For greater security and speed in a hardware implementation, we could run the above in hardware, using 7 BBS generators in parallel (with 7 different 512-bit moduli) and the same 64 bit block algorithm running in OFB mode." A block cipher in OFB mode (Bruce Schneier: *Applied Cryptography*, John Willey & Sons, 1994, p. 162) functions as a cryptographically secure random number generator. Such generators tend to be slower than the inherently stream oriented ones such as LFGs. By re-seeding the shift register, the aforementioned method periodically replaces the entire internal state of the random number generator. The Blum Blum Shub generator can indeed be used to generate from time to time the keys for any cipher. The proposal above only automates the process. This however is not a true combination of several random number generators, because instead of combining their outputs or controlling synchronization one merely affects the internal state of another.

One disadvantage of this method is that it cannot be applied to LFGs, where the internal state is too large. Another disadvantage of this method is that it cannot be implemented in software. The reason is that all the seven BBSs and the block cipher have to run in parallel on several physical processors. The seven BBSs will consume most of the computing power. If the execution was interleaved, which would be the case of software implementation, the system would be so slow as to be impractical. In a variant suitable for software implementation the execution of the block cipher would have to be interleaved with the execution of the BBS generator. In order to achieve reasonable speed the BBS would have to be executed infrequently. It means that the flush register could also be re-seeded only infrequently. Therefore the block cipher would have to be sufficiently secure and thereby slow. At the end very little is achieved over a simple OFB implementation without any BBS (when the aforementioned scheme is implemented in software.) Yet another disadvantage is that it is difficult to determine the exact level of security of the block cipher. If a standard block cipher such as DES were used the speed of the system would be mediocre. The frequent re-seeding of the flush register presumably relaxes the security requirements of the block cipher. But it is very difficult practically to determine what that level should be and how to achieve it.

The fastest known encryption algorithm known thus far is SEAL 3.0. It is described in Phillip Rogaway & Don Coppersmith: "A Software Optimized Encryption Algorithm", *Journal of Cryptology*, vol. 11, num. 4, pp. 273–287, 1998 and in U.S. Pat. No. 5,675,653 "Computer Readable Device Implementing a Software-efficient Pseudorandom Function Encryption". The internal structure of this method bears no resemblance to the present invention. The method of the present invention is as fast or faster than SEAL 3.0.

OBJECTS AND ADVANTAGES

The objects of the present invention are:

a) to provide a very fast (possibly the fastest thus far), yet secure, method of encrypting and decrypting data; and b) to provide a method of generating a pseudo-random stream of numbers, which is nearly as fast as the lagged Fibonacci random number generators (LFG) but has better statistical properties.

DISCLOSURE OF INVENTION

The present invention combines several pseudo-random numbers generators (PRNG) in a cascade structure. The PRNGs in layer 2 run more slowly (typically 64×) than the PRNGs in layer 1. In general The PRNGs in layer n+1 run more slowly (typically 64×) than the PRNGs in layer n. The pseudo-random stream from layer n+1 is used to mangle the pseudo-random stream in layer n. The present invention accomplishes said mangling by taking short segments of the stream from layer n+1 and deriving typically 64 different permutations. Said permutations are XORed with the pseudo-random stream of layer n.

BRIEF DESCRIPTION OF THE DRAWINGS

FIG. 1 is a block diagram of the present invention.

FIG. 2 is a detailed view of one of several identical operational units and its context.

BEST MODE OF CARRYING OUT THE INVENTION

FIG. 1 shows a block diagram of the present invention. Random number generators 1, 2, 3 are Lagged Fibonacci Generators (LFG). These are described e.g. in Donald E. Knuth: *The Art of Computer Programming*, Vol. 2, Semi-numerical Algorithms, Third Edition, Addison Wesley, 1998, pp. 27–29, 186–188. They generate pseudo-random numbers according to the following formula:

$$X[n]=(X[n-p]+X[n-q]) \bmod M, \; p>q>0 \quad (1)$$

In the preferred embodiment q=24, p=55, Linear Feedback Shift Registers (LFSR) are a special case of LFGs such that the modulus M=1. The present invention applies to LFSRs as well to LFGs. In fact any sufficiently fast pseudo-random number generators can be used in place of generators 1, 2, 3. Each of them can be of different kind.

A random number generator 4 is slow but cryptographically secure. In the preferred embodiment it is implemented by an algorithm that randomly picks numbers from a stream of pseudo-random numbers generated by a yet another LFG according to formulas (2), (2').

$$s[i]=LFG[J(i)] \quad (2)$$

$$J(i+1)=J(i)+516 +randc(i+1)] \quad (2')$$

where s[i] it i-th secure pseudo-random number output by slow but cryptographically secure generator 4, LFG[j] is the j-th pseudo-random number generated by said LFG, randc(i) is the i-th pseudo-random number generated by a congruential pseudo-random number generator, said pseudo-random numbers randc(i) being in the interval <0, 999>. The constant 516 can be chosen arbitrarily but should be at least 500. Pseudo-random numbers output by said slow but cryptographically secure generator 4 are picked at intervals, which range from 516 to 1515, from the pseudorandom stream generated by said LFG. Said congruential random number generator randc( ) generates pseudo-random numbers according to formulas (3) and (4).

$$r(i+1)=(r(i)*4096+150889) \bmod 714025 \quad (3)$$

$$randc(i)=(1000/714025)*r(i) \quad (4)$$

Formula (3) describes a classical congruential random number generator, which generates pseudo-random numbers in the interval <0, 714024>. (Donald E. Knuth: *The Art of Computer Programming*, Volume 2, Seminumerical Algorithms, Third Edition, Addison Wesley, 1998, pp. 10–25). The constants 4096, 150889, 714025 cannot be chosen arbitrarily. Formula (4) describes how the pseudo-random numbers from said classical congruential random number generator are modified to produce pseudorandom numbers in the interval <0, 999>. The right side of formula (4) yields a rational number while the result on the left side of formula (4) is an integer; said rational number is converted to said integer such that the fractional part is truncated.

In an alternative embodiment random number generator 4 is quadratic residue generator. This generator generates a sequence of pseudo-random bits $z_1, z_2, z_2, \ldots z_i$. The i-th pseudo-random bit $z_i$ is the least significant bit of $x_i$, where $$x_1=x_{i-1}^2 \bmod n \quad (5)$$

n is a Blum integer i.e. a product p * q of two large prime numbers p, q, which are congruent to 3 modulo 4 i. e. p, q=3 mod 4. The initial integer $x_0$ of the sequence (5) is $s^2$ mod n, s is relatively prime to n. This generator is described in literature and its principle, structure, operation or method is not claimed by this patent. (L. Blum, M. Blum, and M. Shub: "A Simple, Unpredictable Pseudo-Random Number Generator", *SIAM Journal on Computing*, v. 15, n. 2, 1986, pp. 364–383). When said pseudo-random bits are grouped in chunks of 32, each such chunk (or sequence) constitutes a 32-bit pseudo-random number. Said modulus n should have 1024 bits. In order to guarantee that said quadratic residue generator has sufficiently long cycle, p and q should he special primes. Prime p is special if p=2p1+1 and p1=2p2+1 where p1 and p2 are also prime. [Terry Ritter, The Efficient Generation of Cryptographic Confusion Sequences. *Cryptologia*. 15(2): 81–139]

Any sufficiently secure random number generator can be used in place of generator 4.

Three operational units 6, 7, 8 each combine their two inputs. In the preferred embodiment said operational units 6, 7, 8 are identical, are decomposed on FIG. 2, and described in detail below. However it is not necessary for operational units 6, 7, 8 to be identical.

FIG. 1 shows a cascade of three operational units 6, 7, 8 i.e. the number of steps in the cascade is 3. But any reasonable number of steps can be used. In the preferred embodiment all three steps of the cascade are identical but it is not necessary.

FIG. 2 is exploded step of the cascade 13 from FIG. 1. Dashed box 216 is operational unit 6 of FIG. 1. Input 21 is the same as connector 9 of FIG. 1. Inputs 22 are the same as connector 10 of FIG. 1. Inputs 22 provide 64 streams of pseudo-random numbers from LFGs 23. In the preferred embodiment each pseudo-random number is an integer in the interval <0, $2^{32}-1$>. Such integers are usually held in 32-bit registers. But any reasonable number of bits can be used. The 64 LFGs 23 are the same as LFG 1 of FIG. 1. For the sake of simplicity LFGs 23 are depicted as only one block 1 on FIG. 1. Each buffer 24 holds 64 integers from its corresponding LFG 23. Buffer 25 holds 64 integers that have arrived via input 21. The sequence of 64 integers held in buffer 25 will henceforth be referred to as dynamic key. Each permutator 26 will permute said dynamic key. There are 64 permutators 26 and each of them will most likely perform a different permutation. The permutation will be set up at the beginning of each encryption session based on the static key (see below). An adder 27 performs addition modulo $2^n$ (typically n=32). A buffer 28 has the capacity to hold 64×64=4096 integers.

Operation of the Preferred Embodiment

The basic operation is illustrated on FIG. 1. On average generator 2 generates one pseudo-random number once per 64 random numbers of generator 1. Analogically generator 3 generates one pseudo-random number once per 64 random numbers of generator 2, and generator 4 generates one pseudo-random number once per 64 random numbers of generator 3. As a result generator 4 runs approximately 262 000 times more slowly than generator 1.

Before encryption can start, the entire system described herein has to be initialized. The state of the apparatus is the content of LFGs 1, 2, 3 and of slow but cryptographically secure random number generator 4, as well as the state of operational units 6, 7, 8.The number of possible states is very large. Using a key so large is not necessary. A 128-bit key is more than sufficient to make a brute force attack (trying keys one by one) impossible. The preferred embodiment therefore uses 128-bit key, henceforth referred to as static key. It is an equivalent of four 32-bit integers. But in order to initialize all LFGs 1, 2, 3 several hundred or thousand 32-bit integers are needed. Each component 1, 2, 3, 4, 6, 7, 8 are initialized by its corresponding initializer 11. Each initializer 11 uses the static key held in register 12.

More detailed operation is shown on FIG. 2. At the beginning of each encryption session an initialization is performed; a static key is fed in initializer 29. In the preferred embodiment the static key has 128 bits but other key lengths, including but not limited to 64 bits, are possible. Said static key is used to set a permutation in each permutator 26. Each permutator 26 will receive 64 integers in a certain order from its input 210. It will permute said sequence of 64 integers and output said 64 integers on its output 211 in a different order. There are 64! different possible permutations for each permutator 26.

(a) Initialization of LFGs 23

Furthermore LFGs 23 (FIG. 2) also need to be initialized. This task is performed by initializer 215. Initializer 215 fills all 64 registers of each LFG 23 with pseudorandom numbers. In the preferred embodiment the initialization is performed with the help of eight identical congruential random number generators, CRNG1, . . . CRNG8. Said congruential random number generator is described above. A 128-bit static key is broken into eight 16-bit integers and each congruential random number generator is initialized with one of said 16-bit integers, such that each said congruential random number generator is initialized with different said 16-bit integer. Then CRNG1 fills all the registers of each LFG 23. Then the content of all LFGs 23 is permuted using the algorithm in Table 1 and CRNG2 in place of Random( ). Then a stream of pseudo-random numbers generated by CRNG3 is superimposed to the content of LFGs 23 using exclusive or operation. Then LFG4 is used to permute the content of each LFGs 23. The procedure is repeated such that a stream of pseudo-random numbers generated by odd numbered CRNG is superimposed to the content of LFGs 23 using exclusive or operation, and the even numbered CRNG are used to permute the content of LFGs 23.

The following algorithm, expressed in C programming language, is used to permute the contents of all LFGs 23:

TABLE 1

```
for(i=64-1; i>0; i--) {
    m = Random() % i;
    temp = A[i];
    A[i] = A[m];
    A[m] = temp;
}
```

This algorithm was first published by Durstenfeld (Bruce Schneier: *Applied Cryptography*, John Wiley & Sons, 1994, p. 374.) In the preferred embodiment, the even numbered CRNGs are used for the function Random( ). But any sufficiently secure generator can be substituted particularly when the speed of initialization is an issue. However each possible value of the static key should result in a different permutation.

In an alternative embodiment Secure Hash Algorithm (SHA) is used to initialize LFGs 23. SHA is a standard hash function. Its description can be found in NIST FIPS PUB 180, "Secure Hash Standard", National Institute of Standards and Technology, U.S. Department of Commerce, DRAFT, April 1993. It produces a 160-bit hash of any message of any length $<2^{64}$. It can be used in the following manner to initialize LFGs 23: Each LFG 23 consists of a number of 32-bit registers. First a 128-bit static key is written in the first four registers of the first LFG 23. A 160-bit hash function of said four registers is computed with SHA. 128 bit of said 160 bits are selected and written in the next four registers of the first LFG 23. Then another 160-bit hash function of the first eight registers of the first LFG 23 is computed and the process is repeated until all registers of the first LFG 23 are filled. Then a 160-bit hash function using SHA of the entire first LFG 23 is computed and written in the first four registers of the next LFG 23. The process is repeated until all LFGs 23 are initialized.

In yet another alternative the random number generator in initializer 215 is BBS.

(b) Initialization of the Slow but Secure Random Number Generator 4

Slow but secure random number generator 4 has its own LFG. Said LFG also needs to be initialized. This task is performed by initializer 11. Initializer 11 fills all 64 registers of said LFG with pseudorandom numbers. In the preferred embodiment the initialization is performed with the help of eight identical congruential random number generators, CRNG1, . . . CRNG8. Said congruential random number generator is described in section "Initialization of LFGs 23." Said congruential random numbers generators were initialized earlier and there is no need to initialize them again. Then CRNG1 fills all the registers of said LFG. Then the content of said LFG is permuted using the algorithm in Table 1 and CRNG2 in place of Random( ). Then a stream of pseudo-random numbers generated by CRNG3 is superimposed to the content of said LFG using exclusive or operation. Then LFG4 is used to permute the content of said LFG. The procedure is repeated such that a stream of pseudo-random numbers generated by even numbered CRNG is superimposed to the content of said LFG using exclusive or operation, and the odd numbered CRNG are used to permute the content of said LFG.

In an alternative embodiment when BBS is used as a slow but secure random number generator 4 the procedure is as follows, a 128-bit key is multiplied by $2^{512}$ i.e. it is shifted by 512 bits to the left:

$$s = \text{static\_key} * 2^{512} \quad (6)$$

A square modulo n, where n is the modulus of said BBS is computed $$x_0 = s^2 \bmod n \quad (7)$$

Then $x_1$ is computed $$x_1 = x_0^2 \bmod n \quad (8)$$

If $x_0 = x_1$ then s is incremented by one $$s + s + 1 \quad (9)$$

And the whole procedure is repeated until $x_0$ is not equal to $x_1$, it means that said BBS is not in a degenerate cycle.

(c) Initialization of Permutators 26

In the preferred embodiment permutator 26 has 64 registers $R_0, R_1, \ldots R_{63}$. It receives the dynamic key from buffer 25 in chunks of 64 pseudo-random numbers $N_0, N_1, \ldots N_{63}$. Said random numbers are not stored in said registers $R_0, R_1, \ldots R_{63}$ in sequential order but are permutated. This may be illustrated by the way of example: $N_0$ may be stored in $R_{46}$, $N_1$ in $R_{13}$, N in $R_{25}$ etc. As random numbers $N_0, N, \ldots N_{63}$ are received one by one they are stored in appropriate register $R_i$. This is done with the help of 64 address registers $A_0, A_1, \ldots A_{63}$. According to the example, register $A_0$ contains 46, which is the index (address) of register $R_{46}$; register $A_1$ contains 13, which is the index (address) of register $R_{13}$; register $A_2$ contains 25, which is the index (address) of register $R_{25}$. Said registers $A_0, A_1, \ldots A_{63}$ are set during initialization by initializer 29. First each register $A_i$ is loaded with its own index i i.e. $A_0:=0, A_1:=1, A_2:=2, \ldots A_{63}:=63$. Then the content of said address registers $A_0:=0, A_1:=1, A_2:=2, \ldots A_{63}:=63$ is permuted using the same basic permutation algorithm of Durstenfeld that is described above in subsection (a) for permuting the LFGs. Here, a slow but secure random number generator identical with generator 4 is used in a preferred embodiment for the function Random ( ), with the same provisos as in subsection (a) for substituting other generators, and ensuring different permutations for each static key value.

(d) Runtime Operation

Once initialization is completed encryption may begin. 64 pseudo-random integers generated by each LFG 23 are fed to the corresponding buffers 24 via connectors 22. At the same time a dynamic key, consisting of a sequence of 64 integers, is fed to permutators 26. Said sequence of 64 pseudo-random integers i.e. said dynamic key has been generated by an upstream unit of the cascade. Each permutator then permutes said sequence of 64 pseudo-random integers. Most likely each permutators 26 will perform a different permutation.

In an alternative embodiment there is only one LFG 23. Instead of 64 LFGs 23 each generating 64 pseudo-random integers, there is only one LFG generating 64×64=4096 pseudo-random integers. Said 4096 pseudo-random integers are distributed among buffers 24 such that each buffer 24 receives 64 pseudo-random integers. Any reasonable number of LFGs 23 can be used. Equally any reasonable number of permutators 26 can be used.

In the next stage the content of buffers 24, consisting of 64 pseudo-random integers, is shifted out one by one via connector 212. Also synchronously the permutated content of permutators 26, consisting of 64 integers, is shifted out via connector 211. Each two integers, one from buffer 24 and the other from permutator 26 are combined in adder 27. In the preferred embodiment adder 27 performs addition modulo $2^{32}$ but other operations such as subtraction modulo $2^{32}$ or 'exclusive or' are also possible. The resulting integers are fed into buffer 28 via connector 213.

In an alternative embodiment permutators 26 and/or LFGs 23 are themselves permutated from time to time i.e. are assigned to different adders 27. This means that for example the content of the first permutator 26 may be swapped with the content of the 15-th permutator, the content of the second permutator may be swapped with the content of the 36-th permutator etc.

When 64×64 pseudo-random integers from buffers 24 and corresponding 64×64 integers from permutators 26 are processed by adders 27 and fed into buffer 28, said buffer 28 will contain 64×64=4096 integers. At that point these integers are shifted out one by one via output 214.

In an alternative development the integers from adders 27 are not stored in buffer 28 consecutively but in random order, said random order may change dynamically from time to time.

Then the whole procedure is repeated i.e. 64 pseudo-random integers generated by each LFG 23 are fed to the corresponding buffers 24 via connectors 22. At the same time a dynamic key, consisting of a sequence of 64 pseudo-random integers, is fed to permutators 26 etc.

Output 214 can be used as a stream of pseudo-random numbers for mathematical purposes, or it can be used for encryption purposes. When it is used for encryption then the sequence of integers of output 214 is combined with a plaintext. In the preferred embodiment the plaintext is represented as a sequence of octets (bytes). Said octets are concatenated four at a time to form 32-bit integers. Resulting sequence of said 32-bit integers is combined with the sequence of 32-bit integers of output 214. Said combination is accomplished by exclusive or operation. Let $\{Pi\}$=P1, P2, ..., Pi be a sequence of integers representing a plaintext. Let $\{Ri\}$=R1, R2, ..., Ri be a sequence of integers from output 214. The ciphertext sequence $\{Ci\}$=C1, C2, ..., Ci is formed as follows:

$$Ci = Ri \text{ xor } Pi$$

where 'xor' is bitwise exclusive or operation. In the preferred embodiment 'exclusive or' is used but other operations such as addition modulo $2^{32}$ or subtraction modulo $2^{32}$ are also possible.

The decryption process is a simple inversion of the encryption. During decryption the same stream of pseudo-random numbers is generated as during encryption. The plaintext is obtained as follows:

$$Pi = Ri \text{ xor } Ci$$

In order to decrypt a ciphertext the apparatus of the present invention has to be initialized to the same state in which it was prior to encryption.

The methods of encryption and decryption hereby described have been implemented in software using C language. The listing of the program is included with this application as Appendix A.

APPENDIX A

Copyright (c) Cascade Research, 2000
This file is provided onky for research, evaluation, and experimentation.
Using this file for commercial or personal purposes or incorporating it in
any other product without written permission from Cascade Research is prohibited.

```
// SemiTest.c //
#include <stdio.h>
#include <stdlib.h>
#include <string.h>
#include <time.h>
#include "semirami.h"
#include "SlowSec.h"
#include "InitSem.h"
FILE *Input, *Output;
unsigned long binBuffer[BUFFER_SIZE];
unsigned char *pbinBuffer = (unsigned char *)binBuffer;
/* this file contains the key in the form of 4 32-bit unsigned integers */
const char cKeyFile[] = "key.txt";
int main(int argc, char*argv[])
{
    size_t nSize;
    long nTotSize = 0;
    int i;
    unsigned long nKey[4];         /* 128 bits */
    clock_t start, finish;
    if (argc != 3) {
        printf("Wrong number of arguments!\n");
        printf("Semitest <input filename> <output filename> \n");
        exit(1);
    }
```

APPENDIX A-continued

```c
/**** Initialize RNG ****/
/* open key file */
Input = fopen(cKeyFile,"r");
if (Input = = NULL){
        fprintf(stderr, "Could not open %s\n", cKeyFile);
        perror("ERROR!! SemiTest");
        return(1);
}
/* The key consists of 4 32-bit numbers i.e. 128 bits */
printf("\nHere is the key:\n");
for(i=0; i<4; i++){
        fscanf(Input, "%x\n", &nKey[i]);
        printf("nKey[%d] = %x\", i, nKey[i]);
}
printf("\n");
/* close the key file */
fclose(Input);
printf("Input file: %s\n", argv[1]);
printf("Output file: %s\n", argv[2]);
/* open input file */
Input = fopen(argv[1],"rb");
if (Input = = NULL){
        fprintf(stderr, "Could not open %s\n", argv[1]);
        perror("ERROR!! SemiTest");
        return(1);
}
/* open output file */
Output = fopen(argv[2],"wb");
if (Output = = NULL){
        fprintf(stderr, "Could not open %s\n", argv[2]);
        perror("ERROR!! SemiTestt");
        fclose(Input);
        return(1);
}
start = clock();
/* initialize RNG */
InitSemiramis((unsigned char*)nKey);
/* encrypt a file */
while(1){
        /* read buffer */
        nSize = fread(binBuffer, 1, BUFFER_SIZE*sizeof(unsigned long), Input);
        if (ferror(Input) != 0){
                fprintf(stderr, "Could not read from %s\n", argv[1]);
                perror("ERROR!! SemiTest");
                break;
        }
        if (nSize <= 0)         break;          /* file finished */
        /**** encrypt/decrypt buffer ****/
        CryptXOR(binBuffer);     // API
        /* write buffer */
        fwrite(binBuffer, 1, nSize, Output);
        if (ferror(Output) != 0){
                fprintf(stderr, "Could not write to %s\n", argv[2]);
                perror("ERROR!! SemiTest");
                break;
        }
        nTotSize += nSize;
}
finish = clock();
printf("\nFile size = %u KB, duration = %f s\n",
        nTotSize/1024, (double)(finish-start)/CLOCKS_PER_SEC);
fclose(Output);
fclose(Input);
return(0);
}
                        // Semirami.h //
// Fibonacci generator
#define CASCADE_DEPTH 3         // 3 layers, BBS layer not included
#define X_SIZE 64               // size of circular buffers
#define N_GENERATORS_IN_A_LAYER 64
#define BUFFER_SIZE (X_SIZE*N_GENERATORS_IN_A_LAYER)
```

APPENDIX A-continued

```
// Function prototypes - APIs
void InitSemiramis(unsigned char *nInitVal);
unsigned long RandomWord(void);
unsigned char RandomByte();
void CryptXOR(unsigned long nBuffer[]);
                            // Semirami.c //
#include <stdio.h>
#include <stdlib.h>
//#define NDEBUG      /* disable assertions */
#include <assert.h>
#include "InitSem.h"
#include "semirami.h"
#include "SlowSec.h"
//extern FILE *Interm;
/**** FILE SCOPE VARIABLES ****/
static unsigned long nBigBuffer
[N_GENERATORS_IN_A_LAYER*X_SIZE]; // encrypt this
static int iResult = N_GENERATORS_IN_A_LAYER*X_SIZE;
// states of all Fibbonacci generators
static unsigned long nX
[CASCADE_DEPTH][N_GENERATORS_IN_A_LAYER][X_SIZE];
static unsigned long* pnX;              // pointer, used for
speed
/* intermediate layers of random numbers */
static unsigned long nResult
[CASCADE_DEPTH-1][N_GENERATORS_IN_A_LAYER*X_SIZE];
static int iIndexes[3] = {0, 0, 0};
static unsigned long nDynamicKey
[CASCADE_DEPTH]
[N_GENERATORS_IN_A_LAYER];
/* these tables permutate the dynamic key */
static unsigned long iPermutKey[CASCADE_DEPTH]
[N_GENERATORS_IN_A_LAYER][X_SIZE];
/* initialization */
unsigned long nCongState[2*NKEY_LENGTH];      /* states of 8 congruential generators */
/* forward declaration */
static void RunOneLayerOfLFGs(int iLayer, unsigned long* pnBuffer);
/**** This routine gets the dynamic key from the upper segment ****/
static void GetDynamicKey(int iLayer){
    int i, j;
    unsigned long* pnDynamicKey = &nDynamicKey[iLayer][0];
    unsigned long* pnResult = &nResult[iLayer][0];
    /* fill an array with random numbers */
    if (iIndexes[iLayer] >= N_GENERATORS_IN_A_LAYER*X_SIZE){
        iIndexes[iLayer] = 0;
        /* fill nResult[] with random numbers from the LEVEL ABOVE */
        RunOneLayerOfLFGs(iLayer+1, nResult[iLayer]);
    }
    /* get new dynamic key */
    if (0 > iLayer || iLayer > 2) printf("iLayer = %d\n", iLayer);
    assert(0 <= iLayer && iLayer <= 2);
    /* permutate a segment */
    for(i=iIndexes[iLayer],j=0; i< iIndexes[iLayer]+X_SIZE; i++,j++){
        pnDynamicKey[j] = pnResult[i];
    }
    iIndexes[iLayer]= i;
}
/**** This routine gets the dynamic key from BBS ****/
static void FillUppermost(void){
    int i;
    for(i=0; i<X_SIZE; i++){
        nDynamicKey[CASCADE_DEPTH-1][i] = SlowButSecure();
    }
}
/***** This routine realizes the 192 (i.e. 3*64) Lagged Fibonacci generators
* It fills an array of size X_SIZE with pseudo-random numbers
* Input parameters:
*                iLayer < 0, 2> - layer (segment) number, 1 is the fastest segment
*                nBuffer - output array ****/
#define P 24
#define Q 55
static void RunOneLayerOfLFGs(int iLayer , unsigned long nBuffer[])
```

APPENDIX A-continued

```
{
    unsigned int i, k, l, m;                /* indexes */
    int iBuffer;
    unsigned long* piPermutKey;
    unsigned long* pnDynamicKey = nDynamicKey[iLayer];
    assert(P < X_SIZE && Q < X_SIZE);
    iBuffer=0;
    for(m=0; m<N_GENERATORS_IN_A_LAYER; m++){
        i = 0;
        k = (i-Q) & (X_SIZE-1);
        l = (i-P) & (X_SIZE-1);
        pnX = &nX[iLayer][m][0];             // get a LFGs
        piPermutKey = &iPermutKey[iLayer][m][0];
        for(; l<X_SIZE; i++,k++,l++)
        {
            pnX[i] = (pnX[k] - pnX[l]);      // LFG
            // add a random number from permutated dynamic key
            assert(0 <= piPermutKey[m] && piPermutKey[i] <X_SIZE);
            nBuffer[iBuffer++] = pnX[i] + pnDynamicKey[piPermutKey[i]];
        }
        for(l = 0; k<X_SIZE; i++,k++,l++)
        {
            pnX[i] = (pnX[k] - pnX[l]);      // LFG
            assert(0 <= piPermutKey[m] && piPermutKey[i] < X_SIZE);
            nBuffer[iBuffer++] = pnX[i] + pnDynamicKey[piPermutKey[i]];
        }
        for(k = 0; i<X_SIZE; i++,k++,l++)
        {
            pnX[i]= (pnX[k] - pnX[l]);       // LFG
            assert(0 <= piPermutKey[m] && piPermutKey[i] < X_SIZE);
            nBuffer[iBuffer++] = pnX[i] + pnDynamicKey[piPermutKey[i]];
        }
    } // for
    assert(m == N_GENERATORS_IN_A_LAYER && iBuffer ==
N_GENERATORS_IN_A_LAYER*X_SIZE);
    if (iLayer < CASCADE_DEPTH - 1){         /* iLayer < 2 */
        GetDynamicKey(iLayer);               /* 0, 1 */
    }
    else {
        FillUppermost();                     /* 2 */
    }
}
/**** the main APIs ****/
/* CryptXOR(unsigned long nBuffer[])
 * This function xors the array nBuffer with a stream of pseudorandom numbers
 * The buffer is 4096 (i.e. 16 kbytes)32-bit words long ****/
void CryptXOR(unsigned long nBuffer[])
{
    unsigned int i, k, l, m;                /* indexes */
    int iLayer = 0;
    int iBuffer;
    unsigned long* piPermutKey;
    /* There is one dynamic key for all 64 PRNGs */
    unsigned long* pnDynamicKey = nDynamicKey[iLayer];
    assert(P < X_SIZE && Q < X_SIZE);
    iBuffer = 0;
    /* execute this loop for each of the 64 PRNGs */
        for(m=0; m<N_GENERATORS_IN_A_LAYER; m++){
            i = 0;
            k = (i-Q) & (X_SIZE-1);
            l = (i-P) & (X_SIZE-1);
            pnX = &nX[iLayer][m][0];         // get a LFGs
            piPermutKey = &iPermutKey[iLayer][m][0]; /* The permutation is different for each
of the 64 PRNGS */
            for(; l<X_SIZE; i++,k++,l++)
            {
                pnX[i] = (pnX[k] - pnX[l]);  // LFG
                // add a random number from permutated dynamic key
                assert(0 <= piPermutKey[m] && piPermutKey[i] < X_SIZE);
                nBuffer[iBuffer++] ^ = pnX[i] + pnDynamicKey[piPermutKey[i]];
            }
            for(l = 0; k<X_SIZE; i++,k++,l++)
            {
                pnX[i] = (pnX[k] - pnX[l]);  // LFG
                assert(0 <= piPermutKey[m] && piPermutKey[i] < X_SIZE);
                nBuffer[iBuffer++] ^ = pnX[i] + pnDynamicKey[piPermutKey[i]];
            }
```

APPENDIX A-continued

```
            for(k = 0; k<X_SIZE; i++,k++,l++)
            {
                    pnX[i] = (pnX[k] - pnX[l]);        // LFG
                    assert(0 <= piPermutKey[m] && piPermutKey[i] < X_SIZE);
                    nBuffer[iBuffer++]  ^  = pnX[i] + pnDynamicKey[piPermutKey[i]];
            }
    } //for
    assert(m = = N_GENERATORS_IN_A_LAYER && iBuffer = =
N_GENERATORS_IN_A_LAYER*X_SIZE);
        if (iLayer < CASCADE_DEPTH - 1){        /* if (iLayer < 3) */
                GetDynamicKey(iLayer);          /* 0, 1, 2 */
        }
        else {
                FillUppermost();                /* 3 */
        }
}
/**** This routine returns one random 32-bit word ****/
unsigned long RandomWord(void)
{
        if (iResult = = N_GENERATORS_IN_A_LAYER*X_SIZE)
        {
                RunOneLayerOfLFGs(0, nBigBuffer);
                iResult = 0;                    // reset index
        }
        return nBigBuffer[iResult++];
}
/**** Returns evenly distributed random numbers in the interval <0,255> ****/
unsigned char RandomByte(void)
{
        if (iResult = = N_GENERATORS_IN_A_LAYER*X_SIZE)
        {
                RunOneLayerOfLFGs(0, nBigBuffer);
                iResult = 0;                    // reset index
        }
        return (unsigned char)(nBigBuffer[iResult++]*256.0/(0xFFFFFFFF+1.0));
}
/**** void InitSemiramis(unsigned char * nInitVal){
* This function intializes the random number generator
* Input parameters:
*              nInitVal - pointer to an array of 16 bytes holding the key ****/
void InitSemiramis(unsigned char * nInitVal){
        int m, n, i;
        unsigned short * p_16b_nInitVal = (unsigned short *)nInitVal;
        /* copy key to RNG state array, use 8 16-bit words */
        for (i=0; i<2*NKEY_LENGTH; i++){
                nCongState[i] = p_16b_nInitVal[i];
        }
        /* initialize LFGs */
        InitArray(nCongState, &nX[0][0][0],
CASCADE_DEPTH*N_GENERATORS_IN_A_LAYER*X_SIZE);
        /* Initialize the intermediate layers of random numbers */
        InitArray(nCongState, &nResult[0][0], (CASCADE_DEPTH-
1)*N_GENERATORS_IN_A_LAYER*X_SIZE);
        for(n=0; n<CASCADE_DEPTH-1; n++) iIndexes[n] = 0;
        /* initialize dynamic key */
        InitArray(nCongState, &nDynamicKey[0][0],
CASCADE_DEPTH*N_GENERATORS_IN_A_LAYER);
        /* initialize slow but secure generator */
        InitSlow(nCongState);
        /* Initialize the permutations */
        for(m=0; m<CASCADE_DEPTH; m++){
                for(n=0; n<N_GENERATORS_IN_A_LAYER; n++){
                        for(i=0; i<X_SIZE; i++)iPermutKey[m][n][i] = i
                                Shuffle(&iPermutKey[m][n][0], X_SIZE);
                }
        }
}
                                // SlowSec.h //
// Function prototypes
void InitSlow(unsigned long nCongState[]);
unsigned long Fibo(void);
unsigned char ByteFibo (void);
unsigned long SlowButSecure(void);
```

APPENDIX A-continued

```c
                            // slowsec.c //
    #include "InitSem.h"
    #include "SlowSec.h"
    #define LFG_SIZE 4096
    #define K8 2281
    #define L8 1029
// state of the lagged Fibonacci generator
static unsigned int i0, k0, l0;// indexes
static unsigned long nX0[LFG_SIZE]; // circular buffer
// Intializes the simplified slow but secure random number generator
void InitSlow(unsigned long nCongState[])
{
    int i;
    /* initialize LFGs */
    InitArray(nCongState, &nX0[0], K8);
    // initialize indexes
    i0 = K8;
    k0 = (i0-K8) & (LFG_SIZE-1);
    l0 = (i0-L8) & (LFG_SIZE-1);
    for(i=0; i<5000; i++) Fibo();
}
// Returns evenly distributed 32-bit random numbers
static unsigned long Fibo(void)
{
    unsigned long nResult;
    nX0[i0] = (nX0[k0] - nX0[l0]);
    nResult = nX0[i0];
    k0 = (++k0) & (LFG_SIZE-1);
    l0 = (++l0) & (LFG_SIZE-1);
    i0 = (++i0) & (LFG_SIZE-1);
    return nResult;
}
// Simplified implementation of a slow but secure random number generator
unsigned long SlowButSecure()
{
    int i;
    int n;
    n = (int)((1000.0/CMOD)*Congruential()) + 516;
    for(i=0; i<n; i++)
    {
        Fibo();
    }
    return Fibo();
}
                            // InitSem.h //
    #define CMOD 714025L
    #define NKEY_LENGTH 4    /* The 128-bit key consists of 4 32-bit words */
// Function prototypes
void MixIt(unsigned long Array[], int nLength);
void Shuffle(unsigned long Array[], int nLength);
void Clear(void);
void InitCong(unsigned long nSeed);
unsigned long Congruential(void);
void InitArray(unsigned long nCongState[], unsigned long Array[], int nLength);
                            // InitSem.c //
    #include "InitSem.h"
    #include "SlowSec.h"
    #define A1 4096L
    #define A0 150889L
/**** Oldfashioned congruential random number generator ****/
unsigned long nRandom;        // The state of the congruential generator
void InitCong(unsigned long nSeed)
{
    nRandom = nSeed % CMOD;
}
// Returns evenly distributed random numbers
// in the interval <0,CMOD-1>
unsigned long Congruential(void)
{
    nRandom = (A1 * nRandom + A0) % CMOD;    // generate random number
    return nRandom;
}
// Returns evenly distributed random numbers
// in the interval <0,255>
static unsigned char ByteCong(void)
{
    return (unsigned char)(Congruential()*256.0/CMOD);
}
```

APPENDIX A-continued

```
/**** This routine permutates array Array[] of length nLength ****/
void MixIt(unsigned long Array[], int nLength){
    int i;
    long int m;
    long int temp;
    for(i=nLength-1; i>0; i--){
        m = (Congruential() >> 8) % i;
        temp = Array[i];
        Array[i] = Array[m];
        Array[m] = temp;
    }
} /* end MixIt */
/**** This routine permutates array Array[] of length nLength
 * using a different random number generator ****/
void Shuffle(unsigned long Array[], int nLength){
    int i;
    long int m;
    long int temp;
    for(i=nLength-1; i>0; i--){
        m = (SlowButSecure() >> 8) % i;
        temp = Array [i];
        Array[i] = Array[m];
        Array[m] = temp;
    }
} /* end MixIt */
/**** This function fills an array with random numbers
 *      Parameters:
 *          nCongState - art array of 8 RNG states
 *          Array           - the array of 32-bit words to be filled
 *          nLength         - the length of the array ****/
void InitArray(unsigned long nCongState[], unsigned long Array[], int nLength)
{
    int m, i;                                   /* indexes */
    unsigned short * p__16b__Array = (unsigned short *)Array;
    // Clear array
    for(m=0; m<nLength; m++){                   /* use 32-bit words */
        Array [m] = 0L;
    }
    for(m=0; m<2*NKEY_LENGTH; ){                /* use 8 16-bit words
*/
        InitCong(nCongState[m]);
        for(i=0; i<100; i++) Congruential(); // exercise congruential generator
        for(i=0; i<2*nLength; i++) p__16b__Array[i] ^ =
            (unsigned short)((0xFFFF+1.0)*(double)Congruential()/CMOD);
        nCongstate[m++] = Congruential();       /* remeber RNG state */
        InitCong(nCongState[m]);
        for(i=0; i<100; i++) Congruential(); // exercise congruential generator
        MixIt(Array, nLength);
        nCongState[m++] = Congruential();       /* remeber RNG state */
    }
}
```

What is claimed is:

1. A pseudo-random number generating circuit, comprising:

a plurality of pseudo-random number generator (PRNG) units combined in a cascade structure of several layers to produce a pseudo-random output stream, the PRNG units of any given layer running more slowly than those PRNG units of more downstream layers of the cascade structure and running more quickly than those PRNG units of more upstream layers of the cascade structure, the PRNG units including a relatively slow but cryptographically very secure PRNG unit feeding the most upstream layer of the cascade structure.

2. The circuit of claim 1 further comprising:

a plurality of operational units for combining the PRNG units into said cascade structure, each operational unit corresponding to a different layer of the cascade structure and outputting a pseudo-random stream, the most upstream operational unit connected to receive a pseudo-random stream generated by the very secure PRNG unit and all other operational units connected to receive a pseudo-random stream from the next upstream operational unit, each operational unit having means for using that received pseudo-random stream as a dynamic key to mangle pseudo-random outputs of the PRNG units which are in the same layer as that operational unit.

3. The circuit of claim 2 wherein said means for using the received pseudo-random stream as a dynamic key includes:

a plurality of permutation units in each operational unit, each permutation unit performing a permutation upon the received dynamic key segment;

a plurality of combiner units, each combining the permuted dynamic key segment from one of the permutation units with the pseudo-random output from one of the PRNG units into a mangled output; and means for combining the separate mangled outputs from each combiner unit into a single pseudo-random stream output of the operational unit.

4. The circuit of claim 3 wherein the number of PRNG units in any particular layer is less than the number of different permutations that are performed by that layer, but different permutations are applied to different consecutive segments of the pseudo-random output from any one or more of the PRNG units in that layer.

5. The circuit of claim 4 wherein the number of PRNG units in at least one of the layers is equal to one.

6. The circuit of claim 3 wherein the number of permutation units in each particular operational unit equal the number of PRNG units that are in the same layer as that operational unit.

7. The circuit of claim 3 wherein the assignment to particular combiners of at least some of the permutation units and PRNG units is permuted from time to time.

8. The circuit of claim 3 wherein at least some of the permutations performed in each layer dynamically change with time.

9. The circuit of claim 3 wherein the means for combining comprises a buffer concatenating the plurality of mangled outputs of the combiners.

10. The circuit of claim 1 wherein all PRNG units except the very secure PRNG unit are lagged Fibonacci generators characterized by a modulus, a pair of lags, and an initial value.

11. The circuit of claim 10 wherein any one or more of the lags, and the initial value of the lagged Fibonacci generators are initialized by a static key input.

12. The circuit of claim 1 wherein the very secure PRNG unit comprises a quadratic residue generator characterized by a modulus and an initial value.

13. The circuit of claim 1 wherein the initial value is initialized by a static key input.

14. The circuit of claim 1 wherein each layer of the cascade structure combines one upstream pseudo-random stream with a plurality n of pseudo-random outputs from n PRNG units of that layer to produce a pseudo-random stream that is n times longer than the received upstream pseudo-random stream.

15. The circuit of claim 14 wherein n=64.

16. The circuit of claim 1 further including means for combining a message stream with the pseudo-random output stream from the most downstream layer of the cascade structure of the circuit.

17. The circuit of claim 16 wherein the means for combining comprises a bit-wise XOR unit.

18. The circuit of claim 16 wherein the message stream is a plaintext message and the combined output from the XOR unit is an encrypted ciphertext message stream.

19. The circuit of claim 16 wherein the message stream is a ciphertext message and the combined output from the XOR unit is a decrypted plaintext message stream.

20. The circuit of claim 16 wherein the means for combining comprises a modulo addition and subtraction unit, and means for selecting one of said units for a plaintext message stream and the other of said units for a ciphertext message stream.

21. The circuit of claim 1 wherein at least some of the PRNG units and layers of the cascade structure are implemented as one or more microcontrollers running firmware stored in persistent memory.

22. The circuit of claim 1 wherein at least some of the PRNG units and layers of the cascade structure are implemented as one or more digital processors programmed to emulate said PRNG units and layers of cascade structure.

23. The circuit of claim 1 wherein the PRNG units and layers of the cascade structure forming said circuit are implemented by a general purpose programmable computer running a software program emulating said PRNG units and layers of the cascade structure.

24. A pseudo-random number generating circuit, comprising:
a plurality of pseudo-random number generator (PRNG) units combined in a cascade structure of several layers to produce a pseudo-random output stream, the PRNG units of any given layer running more slowly than those PRNG units of more downstream layers of the cascade structure and running more quickly than those PRNG units of more upstream layers of the cascade structure, the PRNG units including a quadratic residue generator unit feeding the most upstream layer of the cascade structure and a plurality of lagged Fibonacci generator units corresponding to each of the layers of the cascade structure, each PRNG unit being initialized by a static key input that sets at least an initial value for each of the PRNG units; and
a plurality of operational units for combining the PRNG units into said cascade structure, each operational unit corresponding to a different layer of the cascade structure and outputting a pseudo-random stream, the most upstream operational unit connected to receive a pseudo-random stream generated by the quadratic residue generator unit and all other operational units connected to receive a pseudo-random stream from the next upstream operational unit, each operational unit having means for using that received pseudo-random stream as a dynamic key to mangle pseudo-random outputs of the lagged Fibonacci generator units which are in the same layer as that operational unit.

25. The circuit of claim 24 wherein each of the lagged Fibonacci generator units is characterized by a modulus m, a pair of lags p and q, and a set of initial values $x[1] \ldots x[p]$, such that $x[n]=(x[n-p]+x[n-q]) \bmod m$, with p>q>0, and at least the initial values are set by the static key input, and p and q may be different for each lagged Fibonacci generator unit in the cascade structure.

26. The circuit of claim 24 wherein said means for using the received pseudo-random stream as a dynamic key includes:
a plurality of permutation units in each operational unit equal in number to the lagged Fibonacci generator units which are in the same layer as the operational unit, each permutation unit performing a permutation upon the received dynamic key segment;
a plurality of combiner units, each combining the permuted dynamic key segment from one of the permutation units with the pseudo-random output from one of the lagged Fibonacci generator units into a mangled output; and
means for combining the separate mangled outputs from each combiner unit into a single pseudo-random stream output of the operational unit.

27. The circuit of claim 26 wherein each permutation unit executes a permutation that is initialized by the static key input.

28. The circuit of claim 26 wherein the combining means comprises a buffer connected to receive the separate mangled outputs, the combining means outputting a concatenated string of the mangled outputs.

29. A pseudo-random number generating method implemented as a software or firmware program in digital processing hardware, the digital processing hardware executing the following programmed steps:
performing, in any order, a first, relatively rapid, pseudo-random number generating procedure a plurality of times for each time a second, relatively slow but cryptographically very secure, pseudo-random number generating procedure is also performed, each performance of either generating procedure producing a segment of a stream of pseudo-random numbers as a result thereof; and successively performing a pseudo-random stream mangling operation a plurality of times upon the plurality of segments of streams of pseudo-random numbers generated by the preceding step to produce an overall pseudo-random output stream, the plurality of performances of the generating procedures and mangling operation being ordered in a cascade sequence of several operational layers in which each layer's execution of the mangling operation uses a plurality n segments of a stream of pseudo-random numbers resulting from successive execution of said first generating procedure as an operand input and another segment of a stream of pseudo-random stream numbers as a dynamic key input and produces a third segment of a stream of pseudo-random numbers as an output, the relative sequential order of producing the operand input and the dynamic key input for any given mangling operation being irrelevant to the performance of that mangling operation, the dynamic key input for a most upstream operational layer of the ordered cascade sequence being a segment of a stream of pseudo-random numbers resulting from execution of said second generating procedure, the dynamic key input for all downstream operational layers of the ordered cascade sequence being the output segment of a stream of pseudo-random numbers from the mangling operation of the next upstream operational layer.

30. The method of claim 29 wherein the mangling operation is accomplished by combining a plurality of permutations of said dynamic key with a plurality of segments of streams of pseudo-random numbers.

31. The method of claim 30 wherein the assignment of a particular combining operation to at least some of the permutations and segments of a stream of pseudo-random numbers dynamically changes from time to time.

32. The method of claim 29 wherein the permutations dynamically change from time to time.

33. The method of claim 29 wherein the first, relatively rapid, pseudo-random number generating procedure comprises a lagged Fibonacci operation characterized by a pair of lags p>q>0 and a set of p initial values $x[1] \ldots x[p]$, set by a static key input, such that each successive generated word $x[n]=(x[n-p]+x[n-q])$ mod m.

34. The method of claim 29 wherein the second, relatively slow but very secure, pseudo-random number generating procedure comprises a quadratic residue operation.

35. The method of claim 29 wherein n=64 and each successive operational layer's output from the mangling operation is n times longer than that from the next upstream layer of the cascade structure.

36. The method of claim 29 wherein the digital processing hardware comprises one or more microcontrollers running firmware stored in persistent memory.

37. The method of claim 29 wherein the digital processing hardware comprises one or more general purpose programmable computers running a software program executing the programmed steps.

* * * * *